United States Patent
Rubens et al.

(10) Patent No.: US 10,682,714 B2
(45) Date of Patent: Jun. 16, 2020

(54) OSCILLATING INTERFACE FOR AN OSCILLATING POWER TOOL

(71) Applicants: Robert Bosch Tool Corporation, Broadview, IL (US); Robert Bosch GmbH, Stuttgart (DE)

(72) Inventors: Jeremy Rubens, Palatine, IL (US); Saad Alam, Franklin Park, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 634 days.

(21) Appl. No.: 15/253,559

(22) Filed: Aug. 31, 2016

(65) Prior Publication Data
US 2018/0056414 A1   Mar. 1, 2018

(51) Int. Cl.
| | | |
|---|---|---|
| *B23D 61/00* | (2006.01) | |
| *B24B 23/04* | (2006.01) | |
| *B27B 19/00* | (2006.01) | |
| *B25F 3/00* | (2006.01) | |
| *B27B 5/32* | (2006.01) | |
| *B24B 23/02* | (2006.01) | |
| *B24B 45/00* | (2006.01) | |

(52) U.S. Cl.
CPC ............ *B23D 61/00* (2013.01); *B24B 23/022* (2013.01); *B24B 23/04* (2013.01); *B24B 45/006* (2013.01); *B25F 3/00* (2013.01); *B27B 5/32* (2013.01); *B27B 19/006* (2013.01)

(58) Field of Classification Search
CPC ......... B23D 61/00; B27B 5/32; B27B 19/006; B24B 23/04; B24B 23/022; B24B 45/00; B24B 45/006; B25F 3/00
See application file for complete search history.

(56) References Cited

U.S. PATENT DOCUMENTS

| | | | | |
|---|---|---|---|---|
| 3,733,094 A | * | 5/1973 | Emter | .................... B27B 5/32 |
| | | | | 403/168 |
| 5,464,365 A | * | 11/1995 | Kim | ...................... B23Q 3/16 |
| | | | | 451/344 |
| 6,796,888 B2 | * | 9/2004 | Jasch | .................. B23B 31/008 |
| | | | | 451/342 |

(Continued)

FOREIGN PATENT DOCUMENTS

EP   2771148 A1   9/2014

OTHER PUBLICATIONS

International Search Report corresponding to International Patent Application No. PCT/EP2017/070374 (5 pages).

*Primary Examiner* — Nathaniel C Chukwurah
*Assistant Examiner* — Mobeen Ahmed
(74) *Attorney, Agent, or Firm* — Maginot, Moore & Beck LLP

(57) ABSTRACT

An oscillating interface for an oscillating too includes a post, a pin which extends through the post, a flange slidably positioned on the post between the pin and a distal end of the post. The flange includes a drive side and a mounting side. The drive side includes a drive structure configured to interlock with a drive structure of an accessory tool. The mounting side is arranged facing the pin and defines at least one notch configured to receive the pin. A clamping member is configured to be threaded onto the post and to clamp the flange against the pin with the pin received in the notch.

16 Claims, 8 Drawing Sheets

(56) References Cited

U.S. PATENT DOCUMENTS

| | | | | |
|---|---|---|---|---|
| 6,945,862 B2* | 9/2005 | Jasch | B23B 31/008 | 451/342 |
| 7,052,384 B2* | 5/2006 | Wolf | B24B 23/022 | 310/50 |
| 7,128,641 B1* | 10/2006 | Lin | B24B 23/022 | 451/359 |
| 7,972,199 B2* | 7/2011 | Blatz | B24B 45/00 | 451/359 |
| 2002/0115394 A1* | 8/2002 | Krondorfer | B24B 23/022 | 451/342 |
| 2003/0088988 A1* | 5/2003 | Baber | B23D 47/126 | 30/390 |
| 2003/0126729 A1* | 7/2003 | Pierce | A47L 11/164 | 29/90.01 |
| 2004/0060404 A1* | 4/2004 | Metzger, Jr. | B27B 5/32 | 83/58 |
| 2006/0276114 A1* | 12/2006 | Gallagher | B24B 23/022 | 451/344 |
| 2008/0003929 A1* | 1/2008 | Degen | B23D 47/005 | 451/359 |
| 2008/0190259 A1* | 8/2008 | Bohne | B24B 23/04 | 83/666 |
| 2010/0056029 A1* | 3/2010 | Grunikiewicz | B23B 31/008 | 451/442 |
| 2011/0039482 A1* | 2/2011 | Timmons | B24B 23/022 | 451/344 |
| 2011/0076927 A1* | 3/2011 | Ho | B24B 23/005 | 451/342 |
| 2011/0291368 A1* | 12/2011 | Chen | B24B 23/04 | 279/143 |
| 2011/0309589 A1* | 12/2011 | Maras | B25F 3/00 | 279/143 |
| 2013/0104719 A1* | 5/2013 | Rubens | B27B 19/006 | 83/835 |
| 2013/0288581 A1* | 10/2013 | Esenwein | B24B 23/028 | 451/363 |
| 2014/0070499 A1* | 3/2014 | Fankhauser | B24B 23/04 | 279/141 |
| 2014/0110908 A1* | 4/2014 | Fankhauser | B23D 51/10 | 279/141 |
| 2014/0171950 A1* | 6/2014 | delRio | A61B 17/14 | 606/82 |
| 2014/0182872 A1* | 7/2014 | Rubens | B27B 19/006 | 173/213 |
| 2015/0035239 A1* | 2/2015 | Maissen | B24B 23/022 | 279/141 |
| 2015/0042052 A1* | 2/2015 | Furusawa | B24B 23/04 | 279/141 |
| 2015/0075830 A1* | 3/2015 | Zhang | B24B 23/04 | 173/213 |
| 2016/0045998 A1* | 2/2016 | Zhou | B27B 5/32 | 279/141 |
| 2016/0129557 A1* | 5/2016 | Yamahara | B24D 5/16 | 451/342 |

\* cited by examiner

OSCILLATING INTERFACE FOR AN OSCILLATING POWER TOOL

TECHNICAL FIELD

The disclosure relates generally to oscillating power tools, and, in particular, to oscillating interfaces for oscillating power tools.

BACKGROUND

In general, rotary tools and oscillating tools are lightweight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool holder, that extends from a portion of the main body of the power tool. The electric motor is configured to rotate and/or oscillate the tool holder at relatively high frequencies. The tool holder in turn is configured to secure different accessory tools so that as the tool holder is driven to move by the electric motor, an accessory tool secured to the holder is driven to perform work on a workpiece.

To enable a secure connection between a tool holder for a power tool and accessory tools for use with the power tool, tool holders and associated accessory tools are provided with oscillating interfaces that mate to secure an accessory tool to a tool holder. The oscillating interfaces of previously known tools typically comprised a flange 62 with a central bore that is typically threaded. The mounting portion of the accessory tool was held against the flange 62 and a clamping screw was threaded into the bore in order to clamp the mounting portion of the blade against the flange 62.

While the oscillating interfaces of previously known tools are effective in securing an accessory tool to the tool holder of the oscillating tool, one issue that is still faced by the oscillating interfaces of tools is the slippage of the flange 62 of the oscillating interface under heavy loads. What is needed is a configuration for an oscillating interface for an oscillating tool that can secure an accessory tool to the tool holder while preventing or limiting slippage of the flange 62 of the tool.

DETAILED DESCRIPTION

Figure 1:
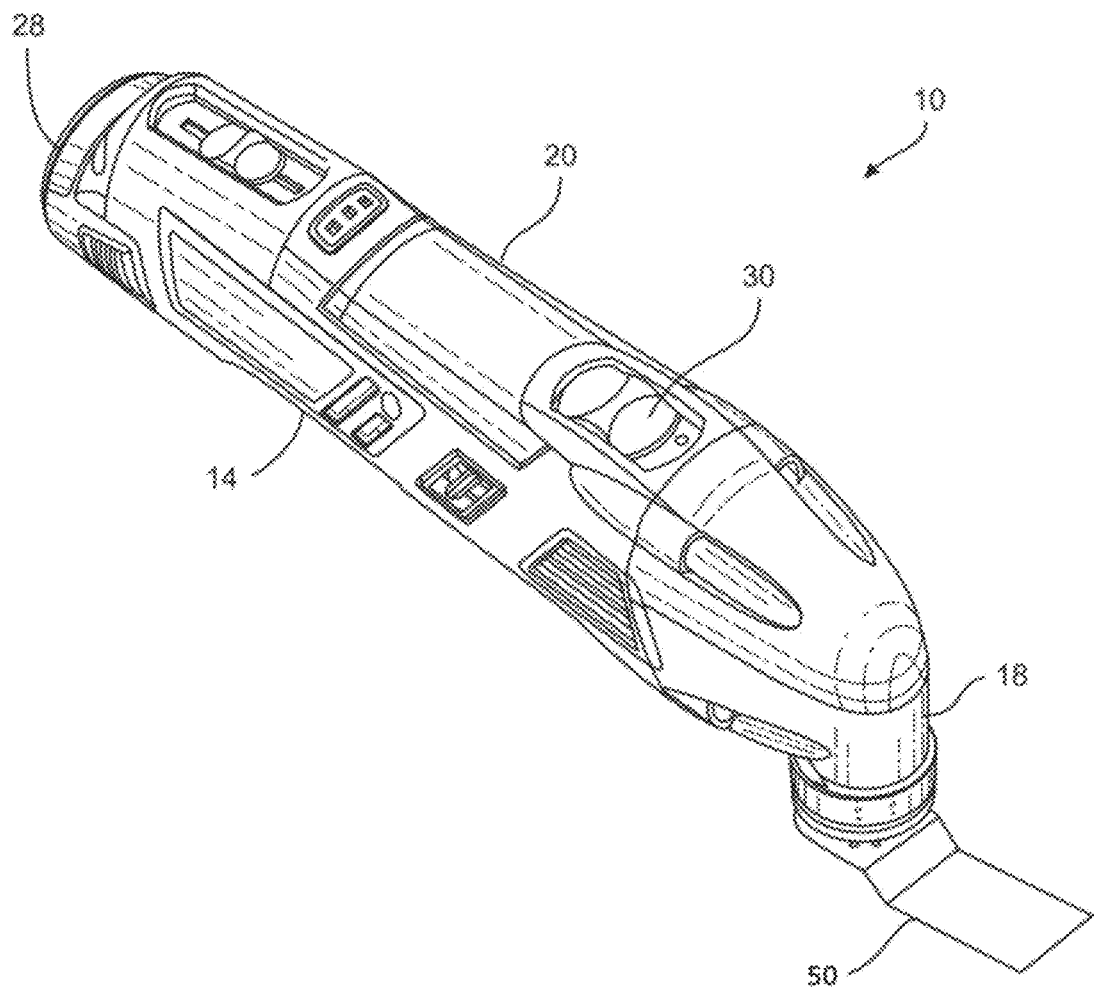
FIG. 1 is a perspective view of an oscillating power tool in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Referring to FIG. 1, the oscillating tool 10 includes a generally cylindrically shaped housing 14 constructed of a rigid material such as plastic, metal, or composite materials such as a fiber reinforced polymer. The housing 14 includes a nose portion 18 and a main body portion 20. The main body portion 20 serves as the handle for the tool 10 and encloses a motor (Not shown). In one embodiment, the motor 24 comprises an electric motor configured to receive power from a rechargeable battery 28 connected at the base of the main body portion 20. In other embodiments, electric power for the motor may be received from an AC outlet via a power cord (not shown). Power to the motor is controlled by a power switch 30 provided on the main body portion 20 of the housing 14.

Figure 2:
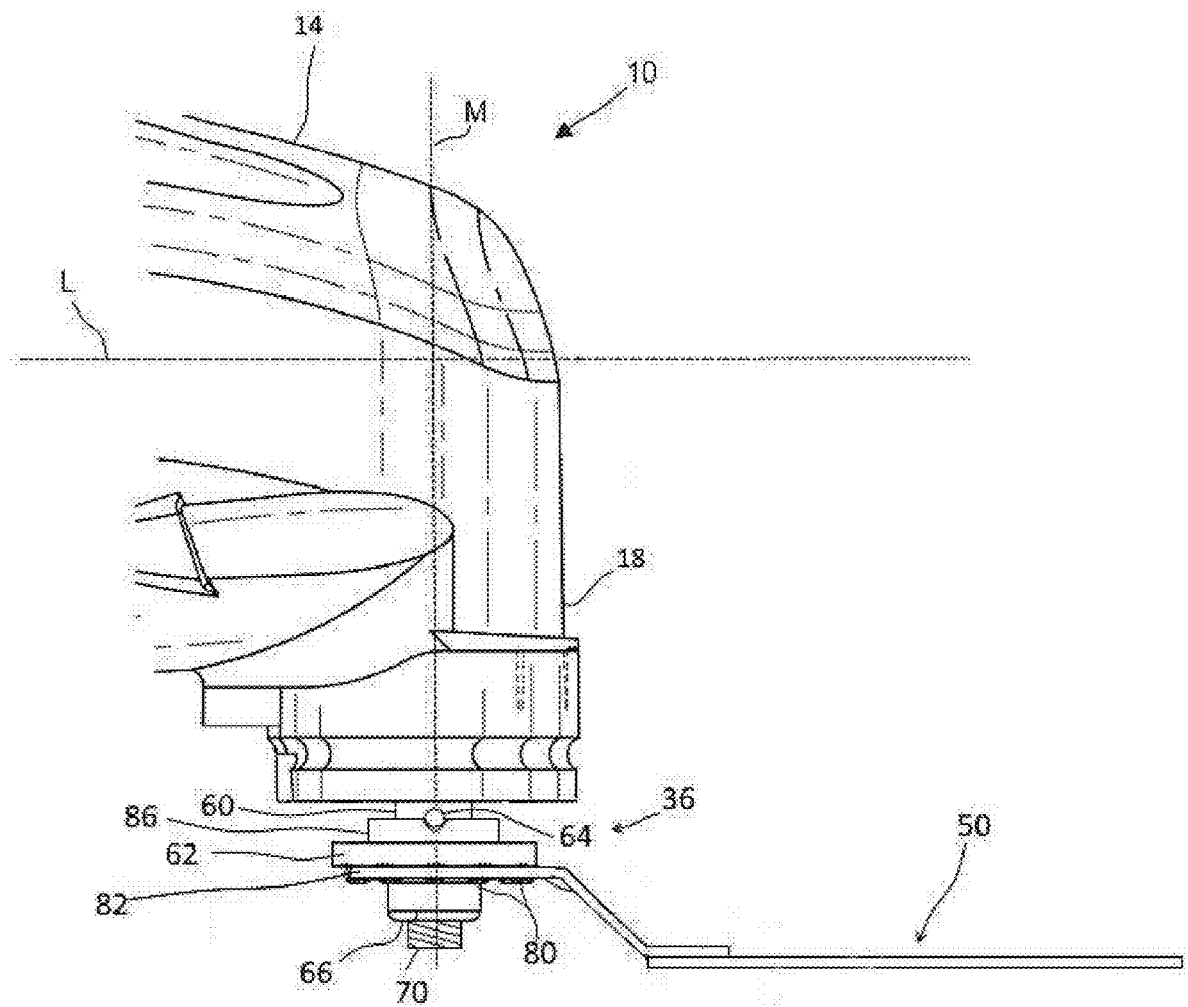
FIG. 2 is a partial view of the oscillating tool of FIG. 1 showing the nose portion of the oscillating tool.

Referring to FIG. 2, the oscillating tool 10 defines a longitudinal axis L. An oscillating drive member (not shown) extends generally perpendicularly with respect to the longitudinal axis L. The motor is configured to oscillate the drive member about an axis M at high frequencies, e.g., 5,000 to 25,000 oscillations per minute, with a small oscillating angle, typically in a range of between 0.5° and 7°. The drive member supports an accessory tool holder 36 exterior to the nose portion 18 of the housing. The tool holder 36 is configured to releasably secure various accessory tools to the drive member, such as the accessory tool 50. As the tool holder 36 is oscillated by the drive member (not shown), the accessory tool 50 is driven to oscillate about the axis M.

Figure 3:
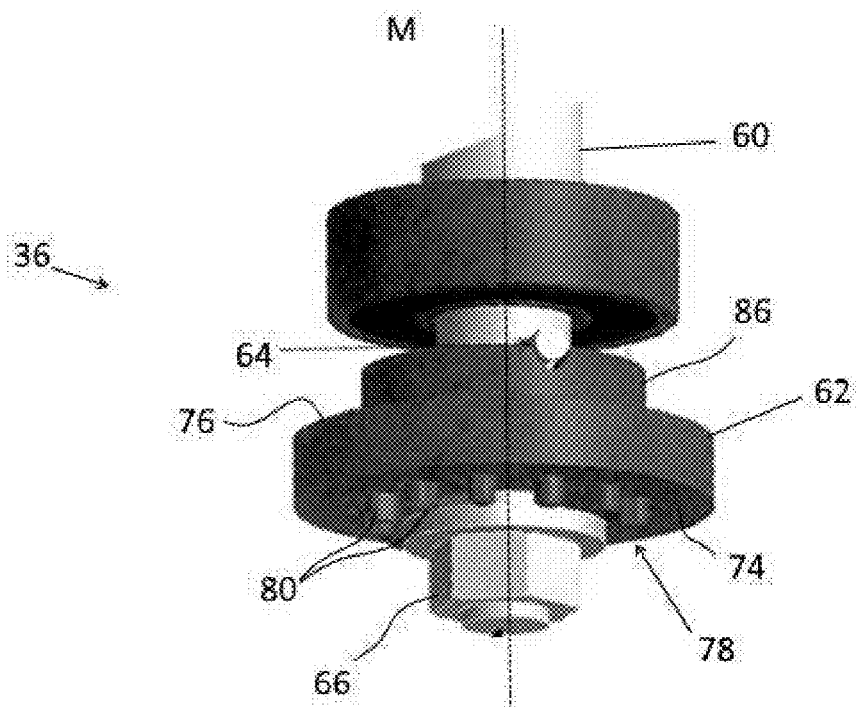
FIG. 3 is a perspective view of the oscillating interface of the oscillating tool of FIG. 1.
Figure 4:
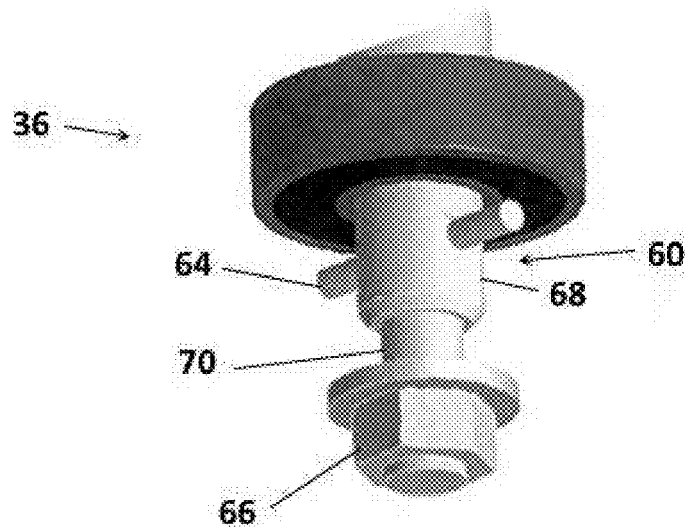
FIG. 4 is a perspective view of the oscillating interface of FIG. 3 with the flange removed.

The tool holder 36 comprises an oscillating interface that enables the accessory tool 50 to be securely retained on the tool holder and oscillated under load. As depicted in FIGS. 2-4, the oscillating interface comprises a post 60, a flange 62, a pin 64 and a clamping member 66. The post 60 extends from the oscillating drive member and is centered on the oscillating axis M. The post includes a flange receiving portion 68 and a threaded portion 70. The flange receiving portion 68 extends from the oscillating drive member and is located externally with respect to the housing 14, and the threaded portion 70 extends from the flange receiving portion 68 and is located distally with respect to the housing.

Figure 5:
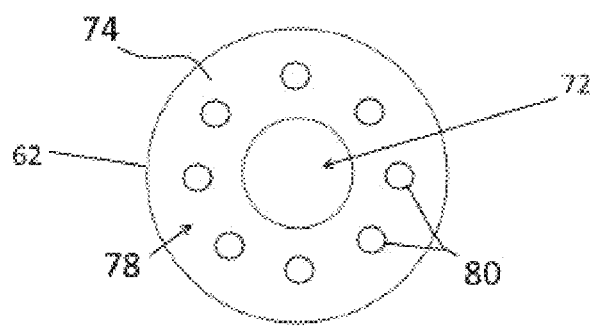
FIG. 5 is a plan view of the drive side of the flange of the oscillating interface of FIG. 3.
Figure 6:
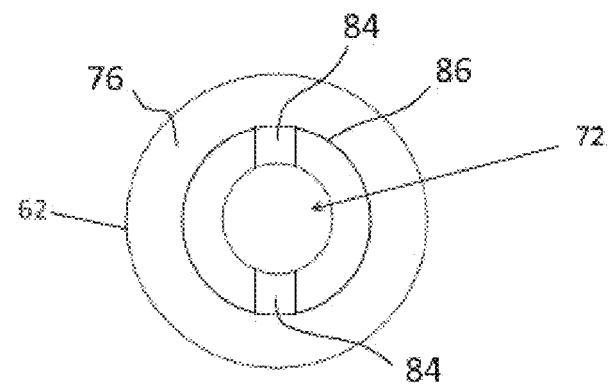
FIG. 6 is a plan view of the mounting side of the flange of the oscillating interface of FIG. 3.
Figures 7A, 7B, 7C:
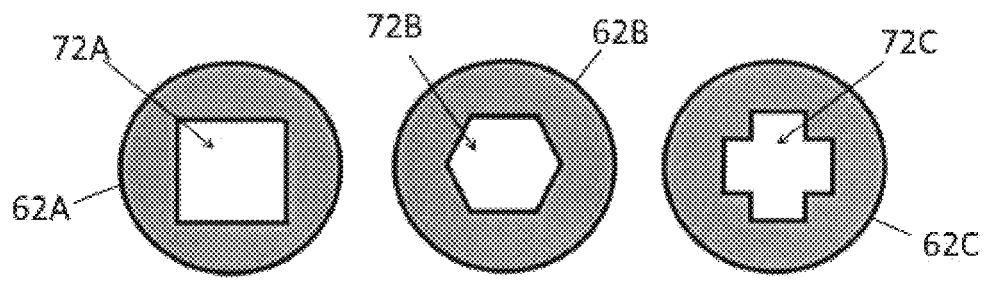
FIGS. 7A, 7B, and 7C depict alternative embodiments of the flange having central openings with different cross-sectional shapes.

The flange 62 is slidably received on the flange receiving portion 68 of the post. Referring to FIGS. 5 and 6, the flange 62 includes a central opening 72 that is sized and shaped complementarily with respect to the flange receiving portion 68 (FIG. 3). In one embodiment, the post 60 and the central opening 72 have matching circular cross-sectional shapes. In alternative embodiments, the flange receiving portion 68 of the post and the central opening 72 of the flange 62 may have non-circular cross-sectional shapes. For example, FIG. 7A depicts a flange 62A having a central opening 72A with a square shape. FIG. 7B depicts a flange 62B having a central opening 72B with a hexagonal shape. FIG. 7C depicts a flange 62C with a central opening 72C having a cross shape. The use of non-circular shapes for the flange 62 receiving portion and the central opening improves the ability of the post to transfer torque to the flange 62.

Referring to FIGS. 3-6, the flange 62 is generally disc shaped and includes a drive side 74 and a mounting side 76. The drive side 74 faces away from the tool and includes a generally flat surface which defines a drive structure 78. In the embodiment of FIGS. 3-6, the drive structure 78 comprises a plurality of protrusions 80 which are arranged about the central opening 72. Because the flange 62 may be removable from the post, different flanges 62 may be swapped out easily which have different drive structure configurations for use with different accessory tools or to replace a flange that has been damaged during use.

Accessory tools for use with the power tool 10 include a complementarily configured drive structure that is configured to mate or interlock with the drive structure 78 of the flange 62. The drive structure of the accessory tool 50 includes a plurality of openings or recesses and a central opening (not visible) that are sized, shaped, and positioned complementary to the protrusions 80 and central opening 72, respectively, of the flange 62. When the accessory tool 50 is placed onto the tool holder 36, the protrusions 80 are received in the corresponding openings and/or recesses defined in the mounting portion 82 of the accessory tool 50. In other embodiments, the flange may be provided with openings, or recesses while the accessory tool drive structure is provided with protrusions, or a matching combination of protrusions and openings/recesses may be provided on the flange and the accessory tool.

The clamping member 66 is used to press the mounting portion 82 of the accessory tool 50 into interlocking engagement with the flange 62 in order to secure the accessory tool 12 to the tool holder 36 as depicted in FIG. 2. The interlocked drive structures enable the oscillating movement of the tool holder 36 to be imparted to the accessory tool 12. As depicted in FIGS. 2-4, the clamping member 66 comprises a nut which includes internal threads which are configured to be threaded onto the external threads of the threaded portion 70 of the post 60.

A metal pin 64 is used to form a stop against which the flange 62 is pressed when the clamping member is installed on the post. The pin 64 extends through a bore defined in the post 60 and is affixed to the post within the bore in any suitable manner, such as by press fit. The bore extends through the central axis M of the post 60 and is oriented perpendicularly with respect to the axis of the post. In one embodiment, the pin 64 has a length that is greater than the diameter of the post such that the pin 64 protrudes from both sides of the post 60 by substantially the same distance. In alternative embodiments, the pin 64 may protrude from only one side of the post or may protrude from both sides of the post by different distances.

When the clamping member 66 is installed on the threaded portion 70 of the post 60, the clamping member 66 is turned until the mounting side 76 of the flange 62 is pressed against the pin 64 (See, e.g., FIG. 2). To prevent slippage of the flange 62 with respect to the post, the mounting side 76 of the flange 62 includes at least one groove or notch 84 that is configured to receive the protruding portion(s) of the pin 64 when the flange 62 is pressed against the pin 62. As can be seen in FIGS. 2 and 3, the mounting side 76 of the flange 62 has a raised portion 86 that is used to define the groove 84. The notch 84 is defined in the raised portion 86 on both sides of the central opening 72 and with the outer ends of the notch being defined in the outer edge portion of the flange 62.

Figure 8:
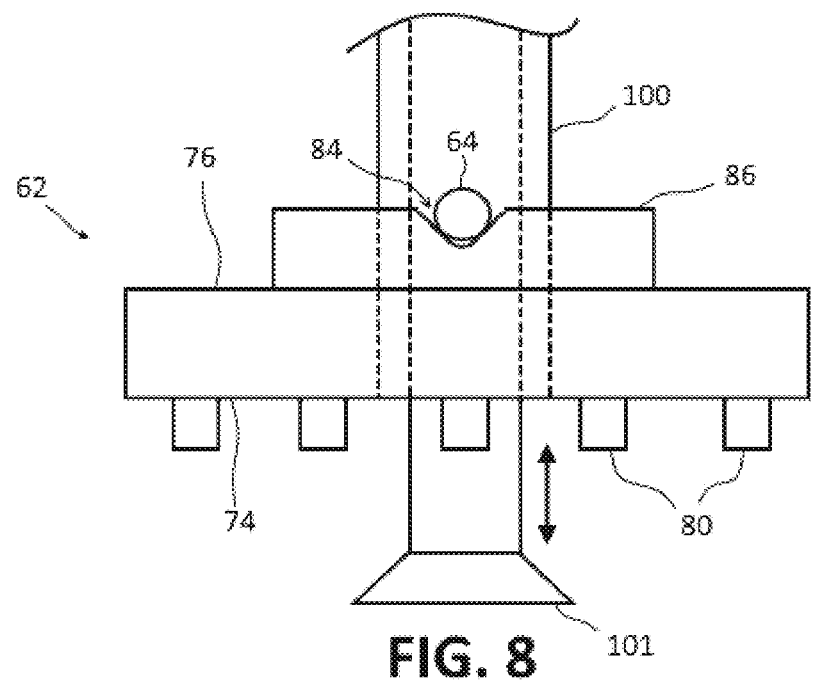
FIG. 8 is a side view of the flange of the oscillating interface of FIG. 3 showing the notch shown with a quick release clamping system.

The notch 84 has a width W at the entrance to the notch which is greater than the diameter of the pin 64 and a depth that enables at least half of the diameter of the pin 64 to be received in the notch 64. In one embodiment, the base of the notch 82 is generally V-shaped such that the width of the notch 84 narrows toward the base of the notch as depicted in FIG. 8. Thus, when the pin 64 is received in the notch, the pin 64 can become wedged within the notch as the clamping member pressed the flange 62 against the pin.

The embodiment of FIG. 8 depicts the flange 62 being used with a quick release clamping system which may be incorporated into an oscillating power tool. The quick release clamping system includes an oscillating member 100 having a central bore and a clamping member 101 that is slidingly received in the bore. The clamping member 101 can be extended away from the flange using a pushbutton or lever (not shown).

Figure 9:
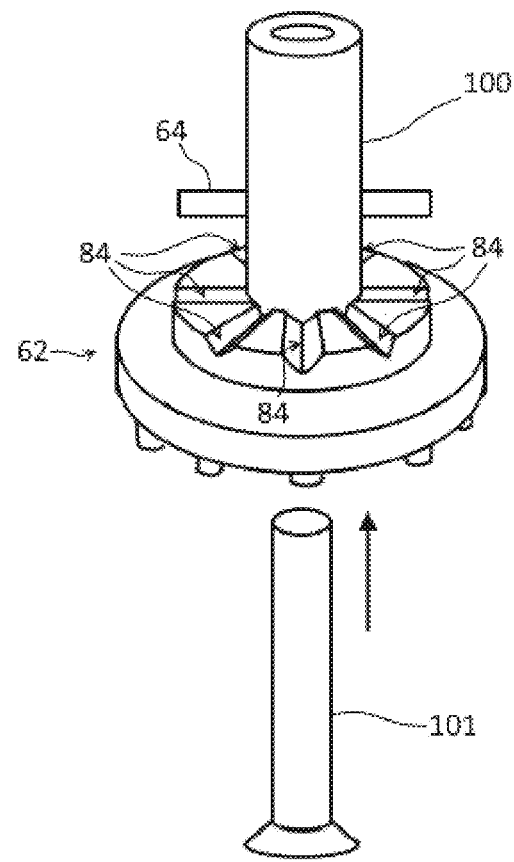
FIG. 9 is a exploded, perspective view of an alternative embodiment of a flange for use with the oscillating interface of FIG. 3 shown with a quick release clamping system, such as depicted in FIG. 9.

For the embodiment of FIGS. 2-8, to change the angular position of the accessory tool 50 with respect to the post 60, the clamping member 66 must be removed and the accessory tool 50 disengaged from the oscillating interface so the accessory tool 50 can be rotated to a desired angular position with respect to the post 60. With the accessory tool 50 at the desired position, the accessory tool 50 is moved into engagement with the drive side 74 of the flange 62 and the clamping nut 66 is then threaded onto the threaded portion 70 of the post until the pin 64 is pressed into the notch 84. A quick release clamping system is depicted in FIG. 9 including the oscillating member 100 and the clamping member 101. When used with a flange 62 having multiple notches 84, such as depicted in FIG. 9, the quick clamping system enables the flange 62 or an accessory tool to be quickly released and rotated to different angular positions as desired.

Figure 10:
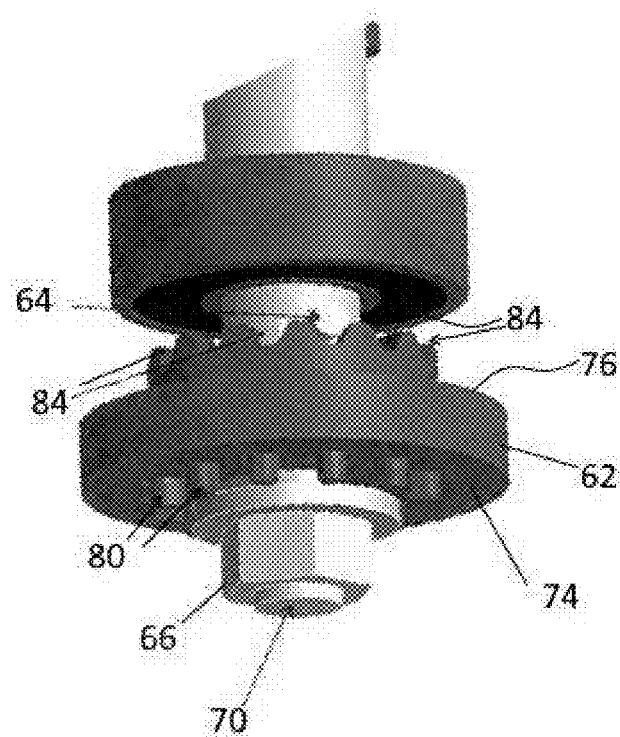
FIG. 10 is a perspective view of an oscillating interface showing the flange of FIG. 9.

FIGS. 9 and 10 depict an embodiment of a flange 62 that enables the angular position of the accessory tool to be changed without removing the clamping member 66 and without disengaging the accessory tool 50 from the flange 62. In this embodiment, the mounting side 76 of the flange 62 is provided with a plurality of notches 84 which are arranged radially about the central opening 72 of the flange 62. In this embodiment, the angular position of the accessory tool 50 can be changed without disengaging the accessory tool 50 from the flange 62. To accomplish this, the clamping member 66 is loosened until the pin 64 can be removed from a first notch. The entire flange 62 can then be rotated along with the accessory tool from a first angular position to a second angular position at which the pin 64 is aligned with a second notch. The clamping member 66 is then tightened until the pin 64 is pressed into the second notch thus securing the flange 62 and the accessory tool at a second angular position with respect to the post.

Figure 11:
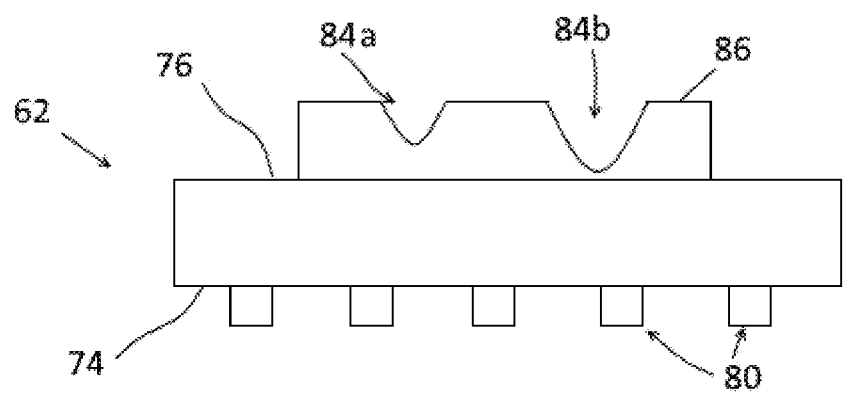
FIG. 11 is a side view of another embodiment of a flange for the oscillating interface of FIG. 3 having notches of different depths.

FIG. 11 depicts an embodiment of a flange 62 having notches 84*a*, 84*b* in the mounting side 76 with varying depths. In particular, the flange 62 includes a first notch 84*a* having a first depth and a second notch 84*b* having a second depth which is greater than the first. The use of notches having different depths enables minor adjustments of the position of the accessory tool 50 with respect to the housing. A deeper notch, such as notch 84*b*, can be used, for example, when performing flush cutting or sanding operations while a shallower notch, such as notch 84*a*, can be used to position a blade closer to the tool for rip cutting operations.

Figure 12:
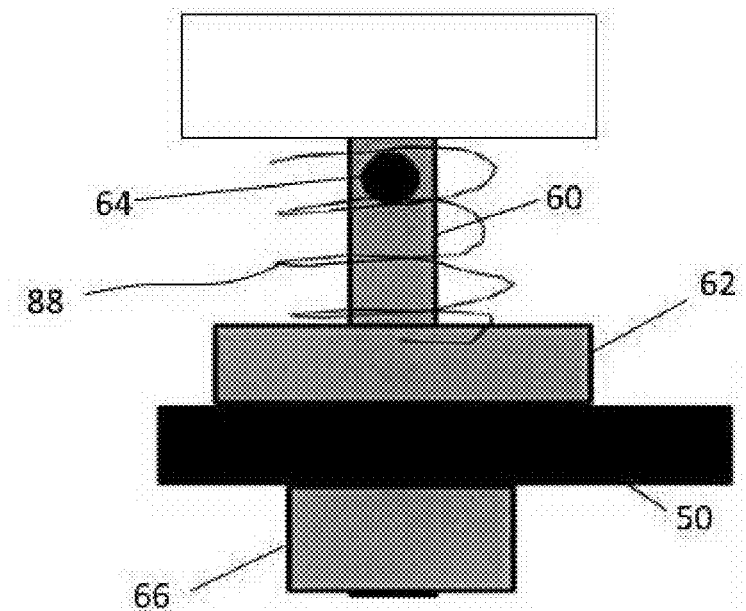
FIG. 12 is a schematic illustration of an oscillating interface showing a biasing member for biasing the flange toward the clamping member.

To facilitate installation of an accessory tool onto the tool holder, the flange 62 may be spring-loaded so that the flange 62 can be held against the mounting portion of the accessory tool 50 to press the tool 50 into the clamping member 66 while the clamping member 66 is still in a loosened state. As depicted in FIG. 12, a biasing member 88, such as a coil spring, may be used to bias the flange 62 toward the accessory tool 50 and the clamping member 66. In other embodiments, any suitable configuration for biasing the flange 62 toward the clamping member may be used.

Figure 13:
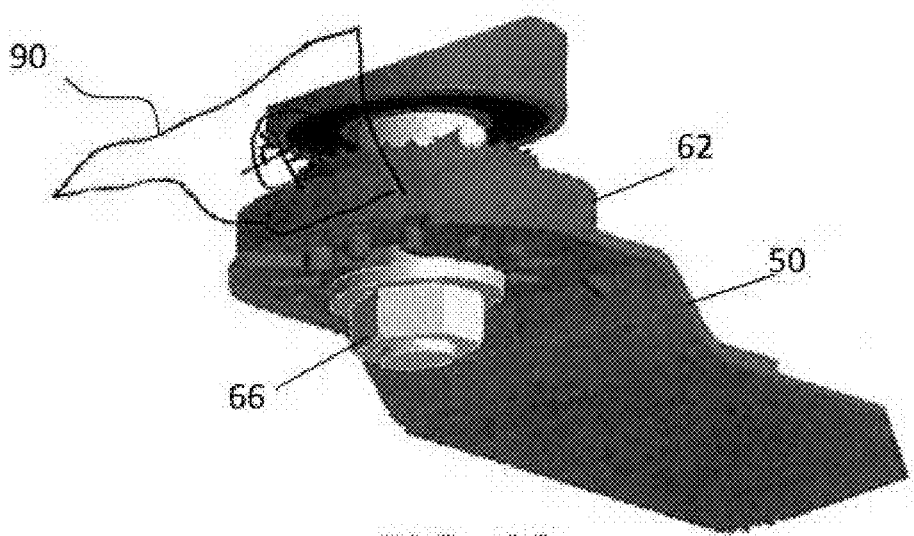
FIG. 13 is a schematic illustration of another embodiment of a flange for the oscillating interface of FIG. 3 having a counterweight.

The flange 62 may be used to provide different functionalities for the tool. For example, FIG. 13 depicts an embodiment in which the flange 62 includes a counterweight 90 for counterbalancing the blade. A counterweight may have any suitable configuration and may be retained on or integrated into the flange 62 in any suitable manner.

Figure 14:
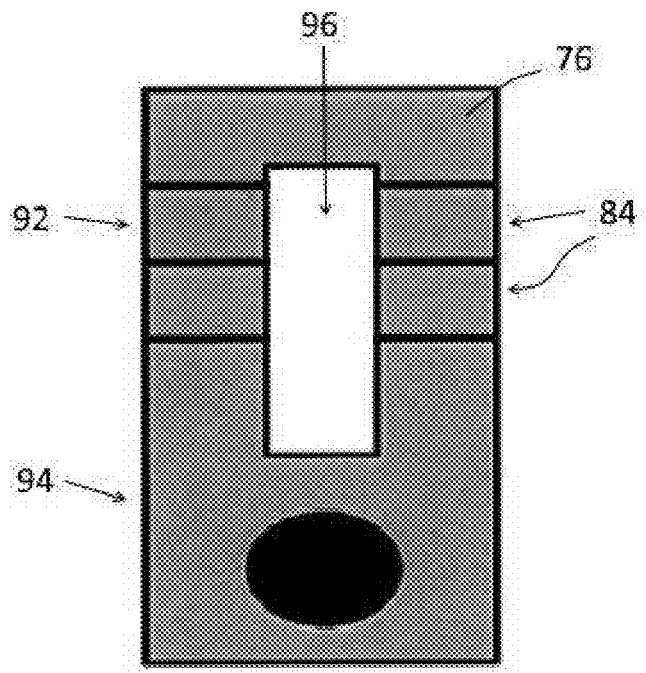
FIG. 14 is a schematic illustration of another embodiment of a flange for use with the oscillating interface of FIG. 3 which enables length adjustments for the accessory tool.
Figure 15:
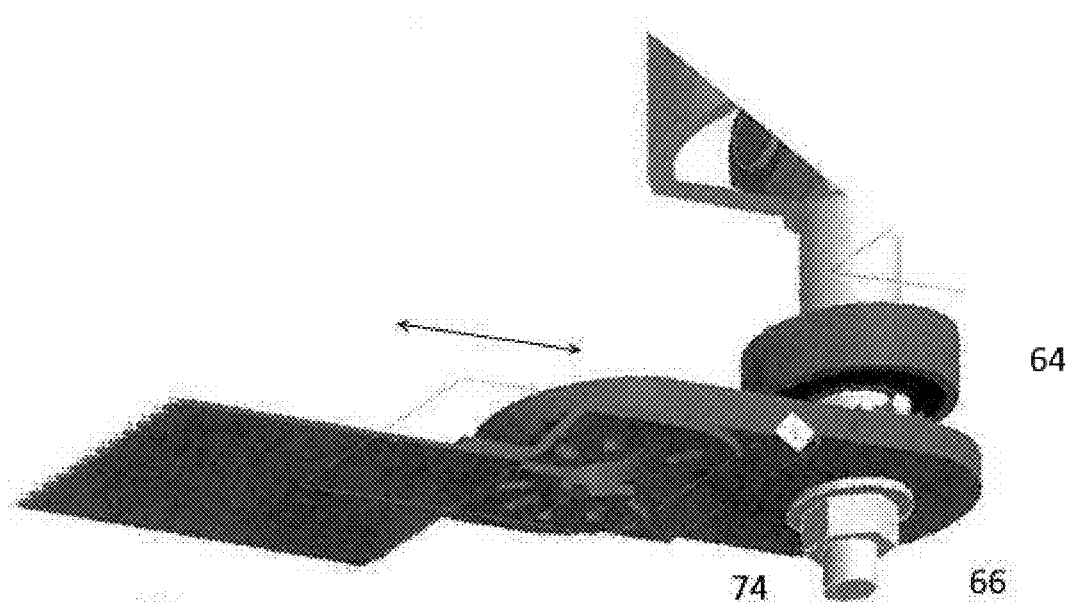
FIG. 15 is a perspective view of the flange of FIG. 14 in use.

FIGS. 14 and 15 depict an embodiment of a flange 62 which may utilize the pin 64 to enable the length of an accessory tool to be adjusted. As depicted in FIG. 14, the flange 62 has a post mounting portion 92 and a tool mounting portion 94. The post mounting portion 92 defines a slot 96 which is configured to receive the post 60. An accessory tool 50 is secured to the drive side 74 of the tool mounting portion 94. In one embodiment, the mounting portion of the flange 62 is configured to enable different accessory tools to be installed and removed from the flange 62 as needed. In alternative embodiments, the flange 62 and the accessory tool 50 may be integrated such that the accessory tool is permanently affixed to the flange 62 to form a single unit.

As can be seen in FIG. 14, the mounting side 76 of the mounting portion 92 includes multiple notches 84 are arranged along the slot parallel to each other and perpendicular to the longitudinal dimension of the slot 96. Each notch 84 defines a different length of extension for the accessory tool 50. When the pin 64 is pressed into a first notch on the mounting side of the flange 62, the distal end of the accessory tool is located a first distance from the tool holder. The clamping member 66 can be loosened to enable the post to be moved along the slot to align the pin 64 with any of the other notches in the mounting side of the flange 62. The clamping member can then be tightened until the pin 64 is pressed into a desired notch which results in the distal end of the accessory tool being located at a different distance from the tool holder.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An oscillating interface for an oscillating tool, comprising:
   a post that extends from an oscillating drive member of an oscillating power tool, the post including an unthreaded flange receiving portion and a threaded portion, the flange receiving portion extending from the oscillating drive member, the threaded portion extending from the flange receiving portion;
   a pin which extends through the post and protrudes from at least one side of the post;
   a flange member slidably positioned on the flange receiving portion of the post between the pin and the threaded portion of the post, the flange member having a one-piece construction including a drive side and a mounting side, the drive side including a drive structure configured to interlock with a drive structure of a mounting portion of an accessory tool, the mounting side being arranged facing the pin and defining at least one notch configured to receive the pin; and
   a clamping member configured to be threaded onto the threaded portion of the post and advanced along the threaded portion of the post until the mounting portion of the accessory tool is clamped against the drive side of the flange member and the mounting side of the flange member is clamped against the pin with the pin received in the notch.

2. The oscillating interface of claim 1, wherein the flange member includes a plurality of pairs of notches which are arranged radially on the mounting side of the flange with the notches in each respective pair being arranged on opposing sides of post, each pair of notches in the plurality being configured to receive the pin.

3. The oscillating interface of claim 1, wherein the clamping member is a nut.

4. The oscillating interface of claim 3, wherein the clamping member is a captive nut.

5. The oscillating interface of claim 1, further comprising:
   a biasing member configured to bias the flange toward the clamping member.

6. The oscillating interface of claim 1, wherein the flange includes a first notch and a second notch which are arranged radially on the mounting side of the flange, the first notch having a first depth, the second notch having a second depth, the second depth being greater than the first depth.

7. The oscillating interface of claim 1, wherein the flange includes a counterweight for counterbalancing an accessory tool attached to the oscillating interface.

8. The oscillating interface of claim 1, wherein the flange includes a slot and a plurality of notches which are arranged parallel to each other and perpendicular to a longitudinal dimension of the slot, and
   wherein the flange includes an accessory tool mounting portion which is configured to retain an accessory tool on the flange.

9. An oscillating power tool comprising:
   a portable, handheld housing;
   a motor enclosed in the housing;
   an oscillating drive member configured to be oscillating by the motor;
   a post extending from the oscillating drive member, the post including an unthreaded flange receiving portion and a threaded portion, the flange receiving portion extending from the oscillating drive member, the threaded portion extending from the flange receiving portion;
   a pin which extends through the post and protrudes from at least one side of the post;

a flange member slidably positioned on the flange receiving portion of the post between the pin and the threaded portion of the post, the flange member having a one-piece construction including a drive side and a mounting side, the drive side including a drive structure configured to interlock with a drive structure of a mounting portion of an accessory tool, the mounting side being arranged facing the pin and defining at least one notch configured to receive the pin; and a clamping member configured to be threaded onto the threaded portion of the post and advanced along the threaded portion of the post until the mounting portion of the accessory tool is clamped against the drive side of the flange member and the mounting side of the flange member is clamped against the pin with the pin received in the notch.

10. The oscillating power tool of claim 9, wherein the flange member includes a plurality of notches which are arranged radially on the mounting side of the flange, each of the notches in the plurality being configured to receive the pin.

11. The oscillating power tool of claim 9, wherein the clamping member is a nut.

12. The oscillating power tool of claim 11, wherein the clamping member is a captive nut.

13. The oscillating power tool of claim 9, further comprising:
a biasing member configured to bias the flange toward the clamping member.

14. The oscillating power tool of claim 9, wherein the flange includes a first notch and a second notch which are arranged radially on the mounting side of the flange, the first notch having a first depth, the second notch having a second depth, the second depth being greater than the first depth.

15. The oscillating power tool of claim 9, wherein the flange includes a counterweight for counterbalancing an accessory tool attached to the oscillating interface.

16. The oscillating power tool of claim 9, wherein the flange includes a slot and a plurality of notches which are arranged parallel to each other and perpendicular to a longitudinal dimension of the slot, and wherein the flange includes an accessory tool mounting portion which is configured to retain an accessory tool on the flange.

* * * * *